United States Patent
Mol et al.

(10) Patent No.: US 7,183,760 B2
(45) Date of Patent: Feb. 27, 2007

(54) POSITION PICKUP FOR ROTATIONAL SPEED SENSOR

(75) Inventors: Hendrik Anne Mol, Sleeuwijk (NL); Johannes Andrianus Maria Duits, Bodegraven (NL)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 10/502,418

(22) PCT Filed: Jan. 23, 2003

(86) PCT No.: PCT/NL03/00048

§ 371 (c)(1),
(2), (4) Date: Mar. 9, 2005

(87) PCT Pub. No.: WO03/062834

PCT Pub. Date: Jul. 31, 2003

(65) Prior Publication Data

US 2005/0162154 A1    Jul. 28, 2005

(30) Foreign Application Priority Data

Jan. 24, 2002  (NL) .................................. 1019828

(51) Int. Cl.
*G01B 7/30*  (2006.01)

(52) U.S. Cl. ............... 324/174; 324/207.25; 324/207.2

(58) Field of Classification Search ............ 324/207.2, 324/207.25, 207.21, 173, 174, 166, 225, 324/207.12; 384/448; 338/32 R, 32 H
See application file for complete search history.

(56) References Cited

U.S. PATENT DOCUMENTS

| | | | | |
|---|---|---|---|---|
| 3,152,261 A | * | 10/1964 | Carlstein ..................... 307/11 |
| 5,059,900 A | * | 10/1991 | Phillips ....................... 324/160 |
| 5,184,069 A | | 2/1993 | Adler et al. |
| 5,680,042 A | * | 10/1997 | Griffen et al. ......... 324/207.21 |
| 6,246,233 B1 | * | 6/2001 | Griffen et al. ......... 324/207.21 |
| 6,956,367 B2 | * | 10/2005 | Fujikawa et al. ...... 324/207.22 |

FOREIGN PATENT DOCUMENTS

| | | |
|---|---|---|
| DE | 197 17 364 C1 | 8/1998 |
| DE | 198 10 218 A1 | 10/1998 |
| EP | 0 952 429 A1 | 10/1999 |

* cited by examiner

*Primary Examiner*—Jay M. Patidar
(74) *Attorney, Agent, or Firm*—The Webb Law Firm

(57) ABSTRACT

Disclosed is a rotational speed sensor comprising a rotatable ring. The rotational speed sensor has K magnetic pole pairs distributed angularly over the rotatable ring. Also, sensors are positioned relative to the rotatable ring such that a varying magnetic field is detected. The sensors comprise a first pair being positioned $2\pi L/K$ radians apart. The sensors further comprise a second pair being positioned $2\pi M/K$ radians apart. The first pair of sensors and second pair of sensors are positioned at a relative position of $(2\pi/K)*((2n-1)/2$ radians. L, M are integers between one and K and n is an integer greater than one.

10 Claims, 1 Drawing Sheet

POSITION PICKUP FOR ROTATIONAL SPEED SENSOR

BACKGROUND OF THE INVENTION

1) Field of the Invention

The present invention relates to a rotational speed sensor comprising a rotatable ring, e.g. connectable to a bearing, having K magnetic pole pairs distributed angularly over the rotatable ring, K being an integer greater than one, and sensor means positioned relative to the rotatable ring such that a varying magnetic field is detected by the sensor means.

2) Description of the Related Art

Such a rotation sensor is known from German patent application DE-A-198 10 218.

A further rotation sensor is known from American patent U.S. Pat. No. 5,184,069, which describes a rotation sensor for detecting relative rotation between two components which are coupled by an anti-friction bearing. The rotation sensor comprises a tone ring with a layer of magnetic ink, the layer defining multiple magnetic poles, with the north and south poles being alternatively positioned at the circumference of the ring. The rotation sensor further comprises a transducer for detecting a varying magnetic field when the two components rotate with respect to each other.

However, the arrangement according to the prior art is susceptible to a number of error mechanisms. The layer having multiple magnetic poles is difficult to manufacture within very strict tolerances. The distance between north and south oriented magnetic poles on the layer is not always constant over the entire layer circumference. This causes the detected magnetic field to have anomalies when the disc rotates, caused by the phase errors, also indicated by the term jitter.

Further problems occur when the layer on which the magnetic poles are arranged is not making a perfect circular motion. This may be caused by radial movement of the layer with respect to the magnetic sensor, and causes further errors in the sensor output signal.

Also, external magnetic fields may influence the signal generated by the magnetic sensor.

BRIEF SUMMARY OF THE INVENTION

The present invention seeks to provide a rotational speed sensor having an improved performance, especially with respect to jitter.

This is accomplished according to the invention by a rotational speed sensor.

In such a configuration, the two magnetic sensors of the first pair look at the same pole of different magnetic dipoles. This allows to obtain a signal with a higher signal strength, reducing the effect of jitter. Also, the second pair of sensors looks at the opposing pole of the magnetic dipoles, i.e. in anti-phase with the first pair of magnetic sensors. This allows to cancel out external influences, such as external magnetic fields and temperature effects.

In a further embodiment, L is equal to K/2 (K being an even valued integer), i.e. the magnetic sensors of the first pair are positioned diametrically opposite to each other. This embodiment allows for a reduced sensitivity to jitter, but also a reduced sensitivity to movement of the disc in a direction along the line connecting the two magnetic sensors, i.e. radial movement of the disc.

To allow detection of the direction of rotation, the sensor means may further comprise an additional magnetic sensor, positioned at $(2\pi/K)*((2m-1)/4)$ radians from the first or second pair of magnetic sensors, m being an integer greater than one. From the phase of the additional magnetic sensor signal, compared with the phase of the other magnetic sensors, the direction of rotation may be determined. Depending on the configuration, a phase advance may indicate a clockwise or counter clockwise rotation.

One further embodiment comprises magnetic sensors of the Hall effect type. These kind of sensors allow to operate in a high temperature environment.

In further embodiments, the rotational speed sensor is connectable to signal processing means. The signal processing means may be arranged to add the signals from the magnetic sensors of the first pair to obtain a first sensor pair signal. Also, the signal processing means may be arranged to add the signals from the magnetic sensors of the first pair to obtain a first sensor pair signal and to add the signals from the magnetic sensors of the second pair to obtain a second sensor pair signal and to subsequently subtract the second pair signal from the first pair signal. Furthermore, the signal processing means may be arranged to add the signals from the magnetic sensors of the first pair and/or the second pair to obtain a first sensor pair signal and/or a second sensor pair signal, respectively, and the signal processing means may be further arranged for determining a speed direction from the first sensor pair signal and/or the second pair signal and the signal from the additional magnetic sensor. These speed sensors with processing means elements may provide the above described advantages resulting in electrical signals for further processing or control purposes. More advantageously, the sensor means and signal processing means are integrated, e.g. in a bearing. As signal lines from the sensors to the processing elements will then be very short, the output signal will be very resistant to external influences, such as electromagnetic interference.

BRIEF DESCRIPTION OF THE DRAWINGS

The present invention will now be explained in further detail using a number of exemplary embodiments, with reference to the accompanying drawings, in which.

DETAILED DESCRIPTION OF THE INVENTION

Figure 1:
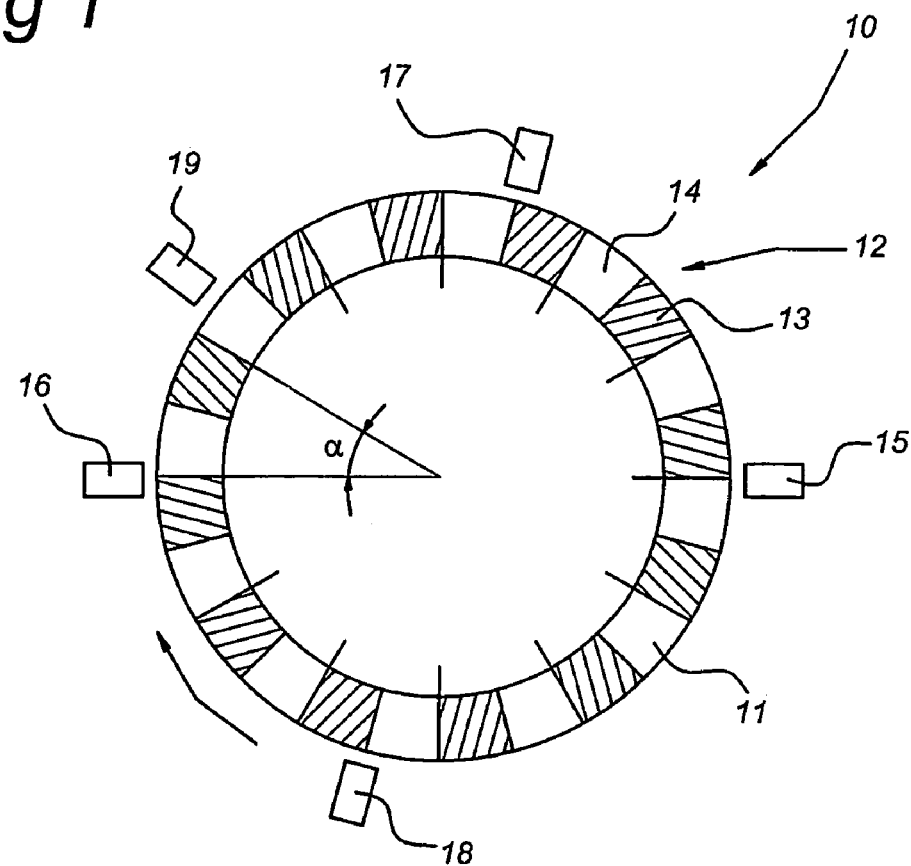
FIG. 1 shows a top view of a rotational speed sensor according to one embodiment of the present invention.

An exemplary embodiment of the rotational speed sensor 10 is shown in a top view in FIG. 1. The speed sensor 10 comprises a ring or disc 11, which may be attached to a rotating element, e.g. a bearing ring. The direction of rotation is indicated in FIG. 1 by the arrow. The ring 11 comprises K magnetic dipoles 12, in the configuration shown K=12. It will be clear that a smaller or larger number of magnetic dipoles 12 may be present. Each magnetic dipole 12 comprises a south pole 13 and a north pole 14. The magnetic dipole orientation is such that at the circumference of the disc 11, the south pole and north pole alternate. Each magnetic dipole 12 subtends an angle $\alpha$ of the disc 11. Ideally, this angle $\alpha$ would be the same for each magnetic dipole 12 of the speed sensor 10. Also, the dimension of south pole 13 and north pole 14 would be identical. However, in practice, the dimensions of the south pole 13 and north pole 14, and of the magnetic dipoles 12 mutually will be slightly different, mainly due to fabrication tolerances. This will cause variations in the magnetic field at a predetermined position at the circumference of the disc 11, an effect also indicated by the term jitter.

Also, when using only a single magnetic sensor to detect the magnetic field at the predetermined position, variations in the distance between sensor and disc will cause anomalies in the detected signal. External magnetic fields will also negatively influence the sensor signal.

In the embodiment shown in FIG. 1, the speed sensor 10 comprises 5 magnetic sensors 15–19 at the circumference of the disc 11. The magnetic sensors 15–19 may be attached to a fixed part, e.g. a fixed ring of a bearing. The magnetic sensors 15–19 may then be used to detect the rotational speed of the disc 11 relative to the magnetic sensors 15–19.

A first pair of magnetic sensors is formed by the sensors 15 and 16. These sensors are positioned exactly opposite each other ($\pi$ radians) and sense the same polarization of oppositely positioned magnetic dipoles 12. The sensors 15 and 16 each provide a sinusoidal shaped signal. In more generalized terms, the sensors 15, 16 of the first magnetic sensor pair must look at the some polarization, or they must be positioned at an angle of $2\pi L/K$ radians apart, in which K is the number of magnetic dipoles 12 of the sensor 10, and L is an integer between 1 and K-1.

A rotational speed sensor 10 equipped with only the first pair of magnetic sensors 15, 16 will show an improved jitter behavior. The signals from the first pair of magnetic sensors 15, 16 may be added, providing a sinusoidal signal with double the amplitude as compared to a single sensor. Also, small errors caused by jitter will be smoothed, thus leading to a jitter-improved signal.

When the magnetic sensors 15, 16 of the first pair are positioned exactly at $\pi$ radians from each other, the speed sensor 10 will also be more resistant to movement of the disc 11 along the line between the two magnetic sensors 15, 16. When the disc 11 moves towards the sensor 15, the signal delivered by that sensor 15 will become larger, but at the same time, the signal delivered by the other sensor 16 will become smaller. By adding the two signals, the resulting signal will show no or less anomalies. Further first pairs of magnetic sensors may be added at multiple angles of the angle $\alpha$ (or at positions equal to $2\pi*1/K$, 1 being equal to a value between 1 and K-1), in which the magnetic sensors of the further first pair are also positioned at $\pi$ radians from each other, to provide further axes along which the sensitivity to radial motion of the disc 11 is reduced.

To further improve the behavior of the rotational speed sensor 10, a further pair of sensors 17, 18 may be added, which 'look' at the other pole of the magnetic dipoles 12. In the top view shown in FIG. 1, the magnetic sensors 17, 18 of the second pair look at a transition from a south pole to a north pole, while the magnetic sensors 15, 16 look at a transition from a north pole to a south pole, i.e. the first pair and second pair are in anti-phase. The signals from the second pair 17, 18 may also be added (as for the first pair), and the resulting signals (which already provide a better jitter resistance) may be subtracted from each other to provide an even better jitter resistant signal. Also, the susceptibility to radial movement of the disc 11 is improved in the same manner as in the embodiment described above. As the resulting sine wave is of a better quality, it will be possible to obtain a more accurate interpolation of the signal.

Figure 2:
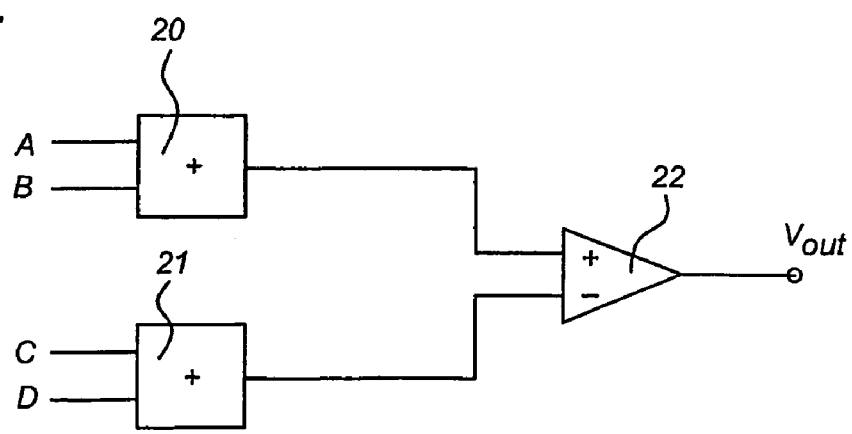
FIG. 2 shows a block diagram of the signal processing means associated with the rotational speed sensor of the present invention.

In FIG. 2, a schematic block diagram is shown of processing means that may be connected to the rotational speed sensor 10 for providing a speed signal. The processing means comprise a first addition element 20, for adding the signals A and B from the magnetic sensors 15 and 16 of the first pair. Furthermore, the processing means comprise a second addition element 21 for adding the signals C and D from the magnetic sensors 17, 18 from the second pair. The resulting signals are subtracted from each other in subtraction element 22. At the output of the subtraction element 22, a signal Vout is present, which has an amplitude which is the quadruple of a single magnetic sensor. Furthermore, the signal has a reduced sensitivity against jitter and radial movement of the disc 11.

In more general terms, the second pair of magnetic sensors 17, 18 should be positioned at an angular distance of $(2\pi/K)*((2n-1)/2)$ radians, n being an integer greater than one. As in the first pair, the magnetic sensors 17 and 18 of the second pair should be positioned relative to each other at an angular distance of $2\pi M/K$, in which M is an integer between one and K-1.

A further advantage of the present rotational speed sensor 10 is that an external magnetic field has the same influence on the signal of the first pair of magnetic sensors 15, 16 as on the second pair of magnetic sensors 17, 18. However, as the signals from these sensors are subtracted from each other, the external influence contribution cancels out. Thus, the present rotational speed sensor 10 has a better resistance against external magnetic field disturbances than prior art sensors, both in static and dynamic conditions.

The rotational speed sensor 10 can easily be modified to allow detection of the direction of rotation of the disc 11. To this end, the speed sensor 10 is further provided with an additional magnetic sensor 19, which is positioned relative to the other magnetic sensors 15–18 with a multiple of $\pi/2$ radians. In more general terms, the additional sensor 19 should be positioned at an angular distance of $(2\pi/K)*((2m-1)/4)$ radians from the first or second pair of magnetic sensors, m being an integer greater than one. The signal from the additional sensor 19, or rather the phase of the signal, can than be compared with the signal from one of the magnetic sensors 15–18. Depending on the relative position of the one sensor and the additional sensor 19, the direction of rotation may be determined. Also, the signal from the additional sensor 19 may be compared with the sensor speed output signal Vout.

A plurality of first and second pairs of magnetic sensors 15–18 may be provided to even further reduce the sensitivity to external magnetic fields, jitter and radial movements.

Figure 3:
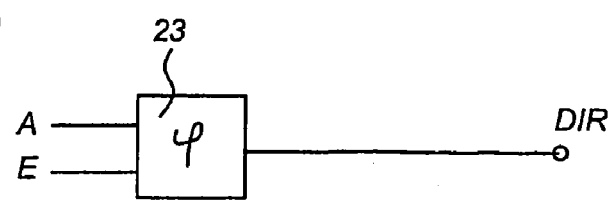
FIG. 3 shows a block diagram of further signal processing means elements.

FIG. 3 shows a block diagram of a further element of the processing means associated with the speed sensor 10. A phase comparator 23 compares the phase of the signal of the additional sensor 19 (indicated with E) and a signal of the first magnetic sensor 16 (indicated with A). It will be clear that the signal A can also be replaced with the signal Vout which is output by the subtraction element 22.

When the magnetic sensors 15–19 are provided as Hall sensors, the speed sensor 10 is able to operate at high operating temperatures, which may be advantageous in many applications. Also, in the differential measurement variant discussed above, temperature compensation of the Hall effect sensors 15–19 will automatically occur.

The speed sensor 10 may be applied in many applications for measurement of rotational speed, e.g. in application where bearings are used. The disc 11 is then affixed to one of the rotating parts, while the magnetic sensors 15–18 are affixed to the other rotating part (or static part). The processing means 20–23 are advantageously integrated with the speed sensor 10. The resulting short signal leads will even further improve the resistance against external electromagnetic fields.

The invention claimed is:

1. A rotational speed sensor comprising a rotatable ring, the rotational speed sensor having K magnetic pole pairs distributed angularly over the rotatable ring, K being an integer greater than one, and sensor means positioned relative to the rotatable ring such that a varying magnetic field is detected by the sensor means, the sensor means comprising at least a first pair of magnetic sensors, the first pair of magnetic sensors being positioned $2\pi L/K$ radians apart from each other, L being an integer between 1 and K−1, wherein the sensor means comprise at least one second pair of magnetic sensors, the second pair of sensors being positioned $2\pi M/K$ radians apart from each other, M being an integer between 1 and K−1, the first pair of sensors and second pair of sensors being positioned at a relative position of $(2\pi/K)*((2n-1)/2)$ radians, n being an integer greater than one.

2. The rotational speed sensor according to claim 1, wherein K is an even integer value and L is equal to K/2.

3. The rotational speed sensor according to claim 1, wherein the sensor means further comprise an additional magnetic sensor, positioned at $(2\pi/K)*((2m-1)/4)$ radians from the first or second pair of magnetic sensors, m being an integer greater than one.

4. The rotational speed sensor according to claim 3, wherein each of the first pair of magnetic sensors, the second pair of magnetic sensors, and the additional sensor is a Hall type sensor.

5. The rotational speed sensor according to claim 3, wherein the rotational speed sensor is connectable to signal processing means, the signal processing means being arranged to add the signals from the first pair of magnetic sensors and/or the second pair of magnetic sensors to obtain a first sensor pair signal and/or a second sensor pair signal, respectively, and the signal processing means are arranged for determining a speed direction from the first sensor pair signal and/or the second pair signal and the signal from the additional magnetic sensor.

6. The rotational speed sensor according to claim 5, wherein the sensor means and the signal processing means are integrated.

7. The rotational speed sensor according to claim 1, wherein the rotational speed sensor is connectable to signal processing means, the signal processing means being arranged to add the signals from the first pair of magnetic sensors to obtain a first sensor pair signal.

8. The rotational speed sensor according to claim 7, wherein the sensor means and the signal processing means are integrated.

9. The rotational speed sensor according to claim 1, wherein the rotational speed sensor is connectable to signal processing means, the signal processing means being arranged to add the signals from the first pair of magnetic sensors to obtain a first sensor pair signal and to add the signals from the second pair of magnetic sensors to obtain a second sensor pair signal and to subsequently subtract the second pair signal from the first pair signal.

10. The rotational speed sensor according to claim 9, wherein the sensor means and the signal processing means are integrated.

* * * * *